United States Patent

[11] 3,613,001

[72] Inventor John L. Hostetter
Santa Ana, Calif.
[21] Appl. No. 882,580
[22] Filed Dec. 5, 1969
[45] Patented Oct. 12, 1971
[73] Assignee Collins Radio Company
Dallas, Tex.

[54] PROBE ASSEMBLY
8 Claims, 9 Drawing Figs.
[52] U.S. Cl. .................................................. 324/158 P,
324/72.5
[51] Int. Cl. ...................................................... G01r
[50] Field of Search .......................................... 324/72.5,
158 P, 158 F, 149; 29/407

[56] References Cited
UNITED STATES PATENTS
3,445,770   5/1969   Harmon .................. 324/158 P Primary Examiner—Michael J. Lynch
Attorneys—Henry K. Woodward and Robert J. Crawford ABSTRACT: A probe assembly for testing integrated circuits and the like including a support member and preloaded probe members mounted on said support member and extending through an opening in said support member. A thermoplastic member encircling said opening supports intermediate portions of said probes and facilitates thermal planarizing of the probe contacts.

INVENTOR.
JOHN L. HOSTETTER

BY  *H. K. Woodward*
ATTORNEY

INVENTOR.
JOHN L. HOSTETTER
BY
ATTORNEY

INVENTOR.
JOHN L. HOSTETTER
BY
ATTORNEY

PROBE ASSEMBLY

This invention relates to semiconductor technology, and in particular to test equipment for semiconductor products such as integrated circuits. The invention includes a test probe assembly with multiple contacts for testing integrated circuits.

An object of the invention is an improved probe assembly for electrically testing very small devices such as semiconductor integrated circuits.

Another object of the invention is a test probe assembly including multiple contacts which are readily adjusted to be coplanar without damaging said multiple contacts.

Yet another object of the invention is a multiple contact test probe assembly including means wherein the multiple contacts are maintained in set relative positions.

Still another object of the invention is an improved probe assembly which is relatively economical in cost.

A feature of the invention is means which facilitates thermally planarizing the multiple contacts in a test probe assembly.

The invention and objects and features thereof will be more fully understood from the following detailed description and appended claims when taken with the drawings, in which:

Integrated circuits are extremely small electronic devices which are useful in performing various digital and analog functions. Their small size permits very high density packaging and allows their application in circuits with much higher speeds than those possible with larger, discrete components.

Briefly, integrated circuits are fabricated by photochemical techniques wherein active and passive circuit elements are formed in and on thin "wafers" of monocrystalline semiconductor material such as silicon. Each wafer may have hundreds or even thousands of identical circuits defined thereon, and after the photochemical fabrication is completed each wafer is scribed along the borders of the individual circuits to facilitate subsequent fracture of the wafer to obtain the plurality of individual integrated circuits.

The major cost in producing completed integrated circuits occurs after the photochemical processing when the various chips are mounted in packages and electrical connections are made between the chip and the package leads. Therefore, it is economically imperative to identify and discard defective integrated circuits prior to packaging. Because of the small size of the individual chips, the electrical testing of the integrated circuits is normally performed prior to the breaking of the semiconductor wafer, and defective circuits are visibly marked so that they may be discarded after the wafer is broken.

Each integrated circuit may have a dozen or more electrical contacts the size of which is typically 5 mils by 5 mils with center-to-center contact spacing distance of 7 mils. It is readily apparent that the test probes used in electrically testing the integrated circuit must meet critical design tolerances. Not only is spacing of the probe contacts critical but also it is critical that the various probe contacts be coplanar to insure proper electrical contact with the various integrated circuit contacts.

Figure 1:
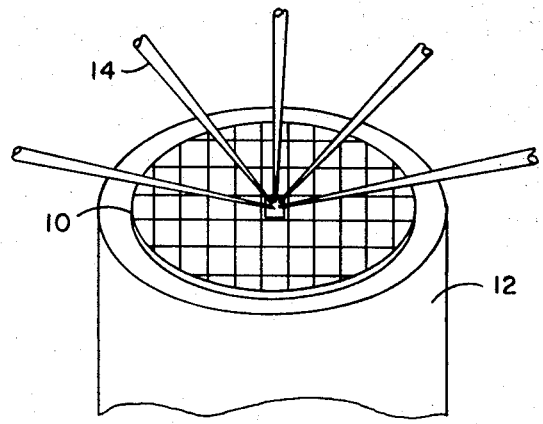
FIG. 1 is an illustrative view of a semiconductor integrated circuit under test.

FIG. 1 is an illustrative view of a semiconductor integrated circuit under test. Typically the wafer 10 is lifted by elevator means 12 into electrical and mechanical contact with the plurality of test probes 14. Because of the small size of the individual integrated circuit, a microscope must be employed to insure proper alignment of the probe contacts and the integrated circuit contacts.

Two general approaches are normally employed in the construction of test probes for integrated circuits. In one approach each probe is independently adjustable with respect to the other probes. Major disadvantages of this construction include cost and bulk of the system since each probe must have three-dimensional ajustability. Further, in changing from one type of integrated circuit to another, each probe must be repositioned individually using a microscope and this operation is very time consuming. Also, a high degree of rigidity must be designed into the probe to provide position stability.

The more popular approach has been the use of a smaller array of fixed probes. Typically, a small diameter (e.g. 10 mils) tungsten wire is used for the probe, and the probes are mounted on a support board made especially for each integrated circuit configuration to be tested. Cost per probe assembly is normally one order of magnitude less expensive than the independently adjustable probe assembly.

Figure 2:
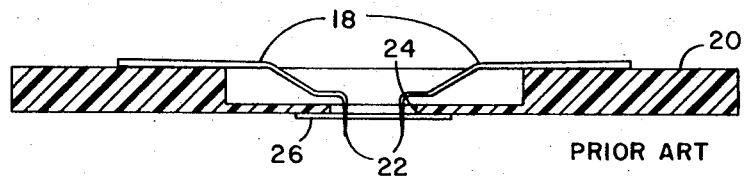
FIG. 2 is a section view of a conventional integrated circuit test probe assembly.

FIG. 2 is a section view of a conventional design of a fixed probe assembly. The individual probes 18 are mounted in cantilever relationship to the upper surface of support board 20 with the probe contact points 22 extending downwardly through a centrally located opening 24 in board 20. A transparent plastic probe guide 26 may be provided across opening 24 on the bottom surface of board 20 to maintain desired positioning of the probe contacts 22.

One major weakness of this probe assembly is the necessity for abrasive planarization of the probe contact points 22 to insure uniform contact with an integrated circuit under test. The abrading of the contact points to achieve the planar relationship thereof necessarily causes the probe contacts 22 to have a flat contact surface rather than a more desirable rounded contact surface. Another disadvantage of this design is that contact pressure is often insufficient when testing an integrated circuit. Contact pressure could be raised by increasing the size of the individual probes, however, the clearance between probes is so small that the use of wire diameters greater than 10 mils is virtually precluded.

Figure 3:
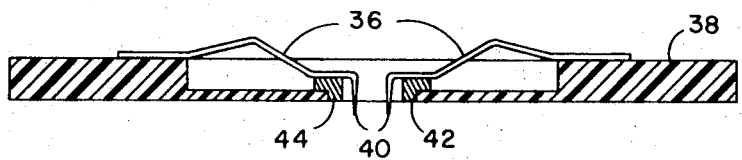
FIG. 3 is a section view of a test probe assembly in accordance with the present invention.

FIG. 3 is a section view of a probe assembly in accordance with the present invention which overcomes the above disadvantages. In this illustrative view only two probes are shown, but it is to be understood that a plurality of probes may be provided as required. As illustrated in FIG. 3, one end of the probes 36 are rigidly affixed to support member 38. This may be done by any convenient means such as soldering the ends of probes 36 to a receptive metallized contact on the upper surface of board 38. Board 38 and the receptive metallized contacts may conveniently comprise a printed circuit board. Similar to the conventional probe assembly described above with reference to FIG. 2, the tips 40 of probes 36 extend downwardly through a centrally positioned opening 42 in board 38. The top surface portion of member 38 adjacent to opening 42 may be counter sunk, as shown.

Mounted around the periphery of opening 42 and extending above said opening is an annular support member 44 fabricated from a thermoplastic material, polysulfone, for example, the softening point of which is above the operating temperature expected to be encountered by the probe assembly and below a temperature which would damage the probe assembly. Probes 36 are biased to engage support member 44 in pressure contact.

Figure 4A:
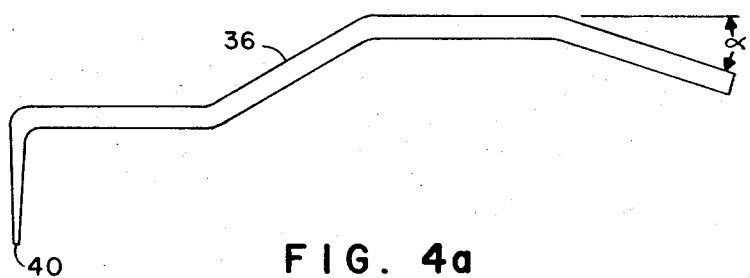
FIGS. 4a, 4b and 4c are plan views of a probe in accordance with the present invention.
Figure 4B:
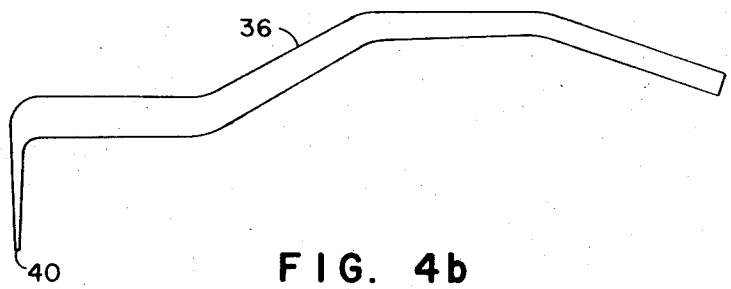
Figure 4C:
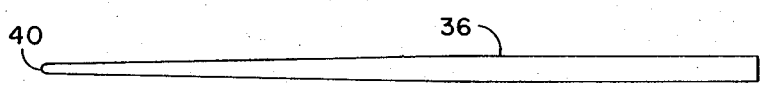

Referring now to FIGS. 4a–4c in one embodiment the probe 36 is formed from 14-mil diameter wire in an annealed condition. Beryllium copper and W3350, a Wilkinson copper alloy including palladium, platinum, gold, silver, and zinc, have been used as wire material. The wires are cut to desired length and one end portion is tapered mechanically by grinding or electrochemically to form a point on the order of 2 mils in diameter at the contact tip 40. Depending on material, it may be preferable to grind the taper of about 3 mils and then draw the contact portion to reduce the diameter to 2 mils. The latter process may eliminate intermediate annealing of the probe. Thereafter, the probe is physically shaped by an appropriate forming die to provide a nearly right-angle bend near the contact tip 40 and to achieve a generally arcuate configuration on the opposite portion of the probe. The preloaded contact pressure of the probes is determined by this arcuate configuration of the individual probes prior to assembly on the support member 38, and especially by the size of the angle $\alpha$ near the attachment end of the probe.

Thereafter, as shown in FIG. 4b, the probe portion near the contact tip 40 is preferably flattened by a press operation to give the probe a tapered configuration when viewed from the top view as shown in FIG. 4c. The tapered configuration increases clearance between adjacent probes in the probe assembly and also increases the vertical rigidity of the probe near the contact tip.

Figure 5:
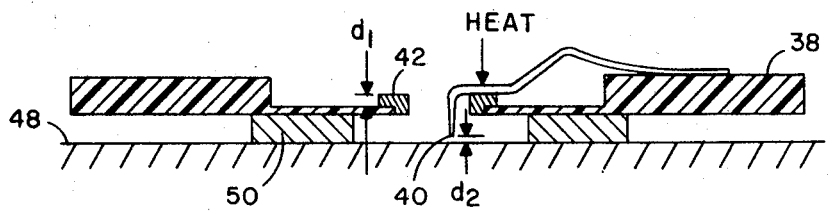
FIG. 5 is a section view of a test probe assembly in accordance with the present invention and illustrates the thermal planarizing of the probe contacts.

A major advantage of the probe assembly in accordance with the present invention lies in the manner of planarizing the contact tips. After the probes are mounted on the support board in proper location relative to the other probes, the assembly is subjected to a thermal planarizing process. With reference to FIG. 5, the probe assembly is placed on a flat surface 48 with an annular shim 50 resting on the flat surface and supporting the probe assembly. The annular shim 50 has a thickness which is equal to the desired protrusion of the probe tips beneath the board 38. The probe assembly is warmed in the vicinity of the thermal plastic ring 42 to a temperature sufficient to soften the ring but without damaging the probe assembly, especially the solder contacts if used in affixing the probe to the member 38. The preload pressure of each probe allows the probe to settle into the ring until the probe point extremities contact the flat surface 48 at which point the settling will stop. After all probes have been thermally planarized in this manner and the assembly has been allowed to cool, the probe assembly is complete with the probe contacts coplanar. The thermal planarizing also forms grooves in the thermoplastic ring 42 which facilitates the positioning of the probes.

It will be appreciated that the thickness, $d_1$, of the thermoplastic member 42 must be greater than the distance, $d_2$, from the probe contacts 40 to the surface 48 prior to thermal planarizing.

Figure 6:
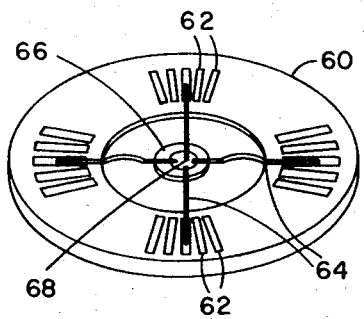
FIG. 6 is a perspective view of the illustrative test probe assembly in accordance with the present invention.

FIG. 6 is a perspective view of a completed probe assembly in accordance with the present invention in which four probes are employed. In this embodiment the support board 60 includes printed circuit contacts 62 to which the probes 64 are soldered. Probes 62 are supported by thermoplastic ring 66 with the probe tips extending through centrally located opening 68.

The use of thermal planarizing as above described has allowed more accurate placement of probe tips than the conventional abrasive coplanarization and without damage to the probe contacts. Further, the grooves which are produced in the thermoplastic support member by the thermal planarizing operation have performed as well as the plastic guide used in the conventional assembly described above with reference to FIG. 2, and the thermoplastic support member offers no obstruction to visibility as does the guide in FIG. 2. Also, when the probe assembly is flattened as above described with respect to FIG. 4b, larger probe stock may be used in fabricating the probes thus improving the ruggedness of the probe assembly.

Figure 7:
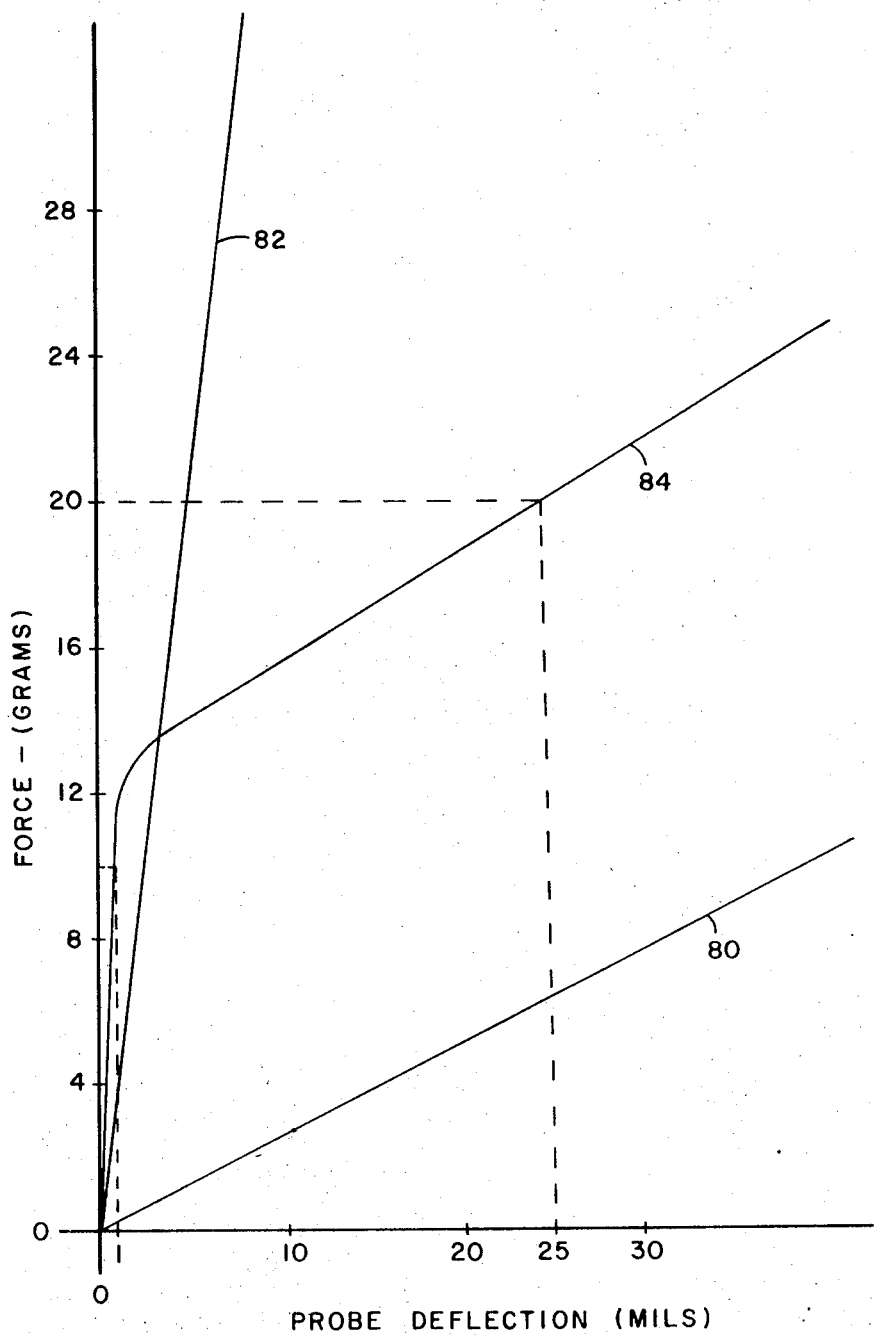
FIG. 7 illustrates the force-deflection characteristics of the probe assembly in accordance with the present invention.

The preloading of the probes in accordance with the present invention offers advantages over the known prior art probes in providing a desired contact pressure with deflection. The earlier probes either require excess deflection to achieve a desired contact pressure (e.g. 10 grams) or excess probe pressure e.g. greater than 20 grams) with a minimum of deflection. These force-deflection characteristics are shown as curves 80 and 82 in FIG. 7. Curve 84 is the force-deflection curve for a probe in accordance with the present invention. It will be noted that a 10-gram force is realized with only 1-mil deflection, while 25 mils deflection produces only a 20-gram force. Thus, a desired contact pressure is realized within an expected deflection range (1 mil to 10 mils).

While the invention has been described with reference to a specific embodiment, the description is illustrative and is not to be construed as limiting the scope of the invention. Various modifications and changes may occur to those skilled in the art without departing form the spirit and scope of the invention as defined by the appended claims.

I claim:

1. A probe assembly for electrically testing very small devices comprising a support member, an opening extending through said support member from a first surface of said support member to a second surface of said support member, a thermoplastic member encircling said opening and extending above said first surface, and a plurality of probes, one end of each probe being rigidly supported by said support member and the other end of each probe extending through said opening with an intermediate portion of each probe in pressure engagement with said thermoplastic member, said thermoplastic member including a plurality of grooves which accept said plurality of probes and facilitates coplanar positioning of said extending probe ends.

2. A probe assembly as defined by claim 1 wherein each probe includes an arcuate portion near said rigidly supported end which facilitates the pressure engagement of said probe with said thermoplastic member, and the other end of each probe defining a contact, all of said contacts being essentially coplanar.

3. A probe assembly as defined by claim 2 wherein each probe is tapered towards the contact end to facilitate close spacing of the probe contacts.

4. A probe assembly for electrically testing integrated circuits and the like comprising a support member, a centrally located opening through said support member extending from a first side thereof to a second side thereof, an annular thermoplastic member positioned about said opening and extending outwardly from said first side, and a plurality of probes, one end of each probe being rigidly supported on said first side of said support member and the other end of each probe extending through said opening with an intermediate portion of each probe in recessed pressure engagement with said thermoplastic member, the ends of said plurality of probes extending through said opening and defining coplanar contacts.

5. A probe assembly as defined by claim 4 wherein said support member includes a plurality of solderable contacts on said first side, and one end of each probe is soldered to one of said contacts.

6. A probe assembly as defined by claim 5 wherein said support member and said contacts on said first side comprise a printed circuit board.

7. A probe assembly as defined by claim 6 wherein said thermoplastic member includes a plurality of grooves which accept said plurality of probes and facilitates positioning of said probes.

8. A probe assembly as defined by claim 4 wherein said thermoplastic member includes a plurality of grooves which accept said plurality of probes and facilitates positioning of said probes.